(No Model.)
H. W. LIBBEY.
WHEEL FOR BICYCLES.
No. 560,509. Patented May 19, 1896.
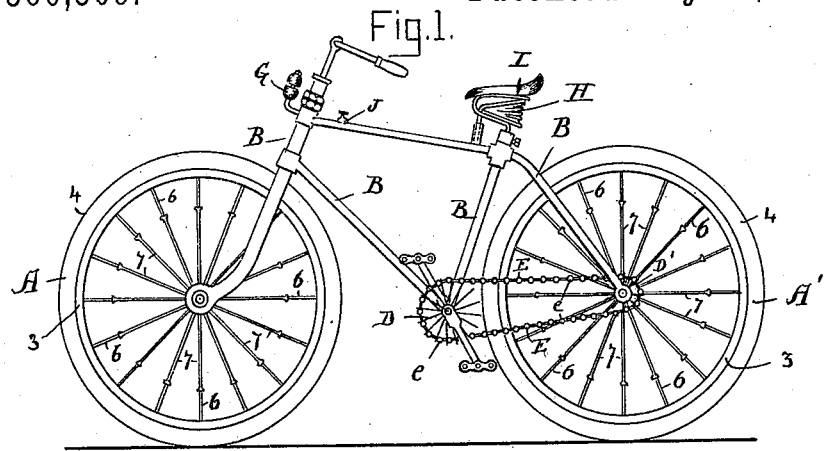
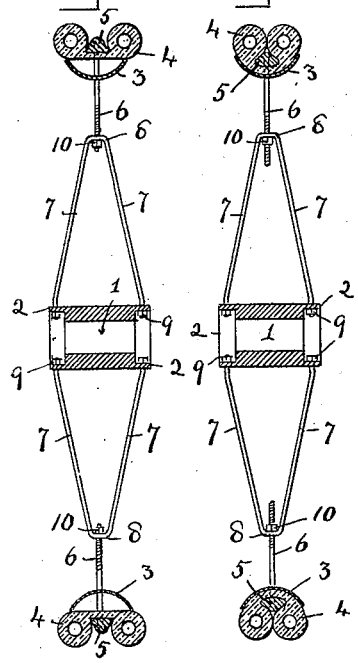 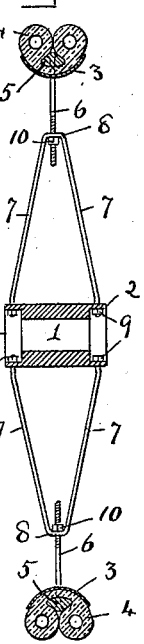 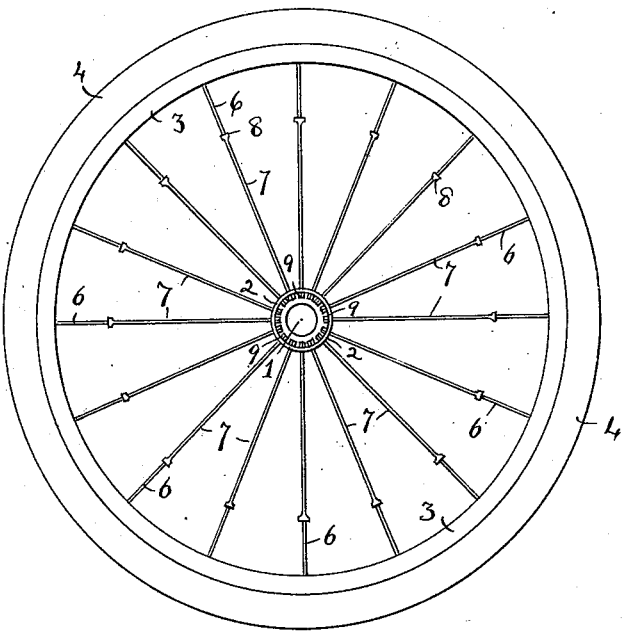
Witnesses:
Winifred G. Kerwin.
Edward S. Brown.
Inventor.
Horace W. Libbey
by Edwin Plante
attorney

UNITED STATES PATENT OFFICE.

HOSEA W. LIBBEY, OF BOSTON, MASSACHUSETTS.

WHEEL FOR BICYCLES.

SPECIFICATION forming part of Letters Patent No. 560,509, dated May 19, 1896.

Application filed December 16, 1893. Serial No. 493,848. (No model.)

*To all whom it may concern:*

Be it known that I, HOSEA W. LIBBEY, a citizen of the United States, residing at Boston, in the county of Suffolk and State of Massachusetts, have invented certain new and useful Improvements in Bicycles, of which the following, taken in connection with the accompanying drawings, is a specification.

My invention relates to certain improvements in tension-wheels; and it consists in the peculiar construction of tension-wheels and tires therefor, as hereinafter fully described, and pointed out in the claims.

Referring to the accompanying drawings, Figure 1 represents a side elevation of a bicycle fitted with wheels embodying my invention. Fig. 2 is a vertical section of the tension-wheel before the tire has been drawn into place. Fig. 3 is a similar view of the wheel completed. Fig. 4 is a side view of same. Figs. 5 and 6 show a view of a tire with a flat tread. Fig. 7 is a longitudinal section of the front-wheel hub, showing antifriction-rings. Fig. 8 is a transverse section taken on line $xx$ of Fig. 7. Fig. 9 is a vertical section through one of the antifriction-rings.

A represents the front wheel, A' the rear wheel, and B the frame, which latter may be of ordinary construction.

The wheels are constructed as follows: The hub is formed of a piece of tubular metal C, in the central portion 1 of which the axle is secured. The outer ends 2 are turned to a greater internal diameter, so as to leave a space for the nuts that secure the spokes, as shown. The rim or felly 3 is formed of sheet metal of semicircular form in cross-section. 4 is the tire, consisting of india-rubber and of the form shown in cross-section—that is to say, representing two rubber tubes united together by a straight piece. Between the tubular portions of the tire are placed metal pieces 5, of triangular form in cross-section, each of said pieces having countersunk holes, through which countersunk headed bolts or rods 6 pass. 7 are round metal bars bent and flattened at their centers 8, their ends passing through holes formed in the rims 2 of the hub and there secured by nuts 9. Holes are formed in the flattened portions 8 of the bars 7, through which holes the ends of the bolts 6 pass and are there secured by nuts 10. By means of the nuts 10 the triangular metal pieces 5 are drawn toward the center of the wheel, and with them the connecting-piece between the tubular portions of the tire is drawn down so as to rest upon the rim or felly 3, thus forcing the two tubular parts into close contact, as shown in Fig. 3, so as to form a double circular-faced tire.

In Figs. 5 and 6 I have shown a tire of similar construction to that before described, but with flat outer faces, so that when drawn into place, as in Fig. 6, they will present a flat tread.

The hub of the front wheel I divide longitudinally, as shown in Figs. 7 and 8. Each portion of said hub is recessed out near its ends to receive an antifriction-ring F, contracted in its center, so that its outer end that forms the bearing is of a slightly greater width than its central portion, said rings being slipped over the axle and said axle working in the rings and the rings in the recesses in the hub of the wheel, whereby the friction is much reduced.

What I claim is—

1. A bicycle or tension wheel the hub of which is formed from a solid piece of metal bored out to receive the axle and having an annular recess at each end thus forming a flange in combination with bent rods flattened at their apex and straddling the hub to which their ends are secured by nuts each rod thus forming two spokes or tension-rods spread at the hub-contact—tension-bolts passing through the felly and through the apex or flattened portion of the bent tension-rods and nuts for securing same substantially as set forth.

2. In combination with a bicycle-wheel a tire consisting of a central flat portion having a tube at each end in combination with a semicircular rim or felly and a bolt passing through the central flat portion of the tire through the rim and connects same to the spokes the head of said bolt depressing the central portion of the tire whereby the two tubes are drawn together substantially as set forth.

In testimony whereof I have signed my name to this specification, in the presence of two subscribing witnesses, on this 27th day of April, A. D. 1893.

HOSEA W. LIBBEY.

Witnesses:
CHAS. STEERE,
EDWIN PLANTA.